United States Patent
Collins, Jr. et al.

(10) Patent No.: US 7,241,325 B2
(45) Date of Patent: Jul. 10, 2007

(54) POLISHING COMPOUND

(75) Inventors: George B. Collins, Jr., Murray, KY (US); Stanley Brent Henley, Murray, KY (US); Janis Wylam Anderson, Danbury, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 102 days.

(21) Appl. No.: 11/038,505

(22) Filed: Jan. 19, 2005

(65) Prior Publication Data

US 2005/0172564 A1 Aug. 11, 2005

Related U.S. Application Data

(60) Provisional application No. 60/543,464, filed on Feb. 10, 2004.

(51) Int. Cl.
C09G 1/02 (2006.01)
C09G 1/04 (2006.01)

(52) U.S. Cl. ............... 51/307; 51/308; 51/309; 106/3; 106/11

(58) Field of Classification Search ........ 51/307, 51/308, 309; 106/3, 11; 510/395, 396, 397, 510/507, 511
See application file for complete search history.

(56) References Cited

U.S. PATENT DOCUMENTS 4,005,027 A    1/1977  Hartman ............. 252/95
4,116,851 A *  9/1978  Rupe et al. .......... 134/25.2
4,248,728 A    2/1981  Puryear ............. 252/103
5,645,633 A *  7/1997  Ogawa ............ 106/287.14

OTHER PUBLICATIONS

"Auto Polish No. 338 and Furniture Polish No. 337", Household Products Formulary, VANGEL® and VEEGUM®, R.T. Vanderbilt Company, Inc., Booklet No. 83, p. 7, Aug. 1983.
MSDS, Rose Rubbing Compound, Bondo Corporation, Aug. 3, 2001.
MSDS, Rubbing Compound MD804, R.T. Vanderbilt Company, Inc., Apr. 2004.

* cited by examiner

*Primary Examiner*—Michael Marcheschi
(74) *Attorney, Agent, or Firm*—Norris McLaughlin & Marcus PA

(57) ABSTRACT

An abrasive composition is provided based on the following:

| | |
|---|---|
| an abrasive, preferably feldspar | 7-59% |
| a clay, preferably smectite clay | 3-7% |
| water | 37-64% |
| an organic solvent, such as kerosene | 3-20%, |
| and additionally, preferably contains | |
| calcium carbonate | 20-30%, and |
| a surfactant | 0.01-1%. |

The composition may have particles of up to 100 μm, and preferably average particle size diameter of 30-45 μm.

6 Claims, No Drawings

POLISHING COMPOUND

This application claims priority under 35 USC 119(e) based on Ser. No. 60/543,464, filed Feb. 10, 2004.

BACKGROUND OF THE INVENTION

1. Field of the Invention

The present invention relates to an abrasive polishing composition, such as a paste or liquid, particularly useful as a buffing composition for automotive coatings or the like, and more particularly for scratch removal and polishing. In addition, such a composition may be used in hard surface cleaners, cleaners for plastic and rubber surfaces, liquid cleansers and hand cleaners.

The used automotive resale industry utilizes rubbing and polishing compounds during the cleanup and detailing process to achieve a high luster finish on auto bodies prior to the resale of a vehicle. The cleanup and detailing process typically involves washing the vehicle and then polishing the body finish with a rubbing compound to clear any noticeable scratches from the surface. This is followed by the application of a glazing compound to achieve a showroom quality finish. The car is then waxed, and receives a final buffing. It should be understood that, while the composition is described with respect to use in the automotive resale industry, use of the composition is not limited to this purpose.

2. Prior Art

Typical buffing compositions are based on alpha quartz (crystalline silica) and other similar abrasives at amounts up to about 35% or more. Such compositions are available from Bondo Corporation as Rose Rubbing Compound (Stock No. 885D) (35-45% silica), Turtlewax® rubbing compound, Meguiar's Corporation Deep Crystal System Paint Cleaner (2-13% diatomaceous earth and calcined kaolin clay) and 3M® Super Duty rubbing compound (30-60% silica). These compositions typically contain the silica in a carrier, such as kerosene; and the indicated percentages of silica are given with respect to the final composition including the carrier. However, there is a desire to improve the performance in the desired areas of good workability, while minimizing swirl marks and hazing of the coating. It is also desirous to reduce the amount of kerosene used.

An automotive coating polish is known based on Veegum® smectite clay (hydrated magnesium aluminum silicate) available from R. T. Vanderbilt Company, Inc. The formulation Auto Polish No. 338, set forth in Household Product Formulary, published by R. T. Vanderbilt Company, Inc. as Booklet No. 83, comprises 1.0% smectite clay, 10.0% aluminum silicate, 34.5% water, in a carrier.

The processing of smectite clay produces a fraction comprising calcium carbonate and feldspar, and amounts of smectite clay, as well as small amount of alpha quartz. In particular, such a fraction may typically comprise about 5-80% carbonate, 20-35% feldspar and 0.5-6% quartz. The fraction may also contain, in some cases, trace amounts of opal CT, a partially crystalline form of silica.

SUMMARY OF INVENTION

The present invention provides a buffing composition which has good or better workability and provides excellent sheen, and which minimizes swirl marks and hazing of the coating. The inventive composition is advantageously prepared from a fraction produced during the processing of smectite clay. Nevertheless, the composition may of course be prepared per se from the basic components. Depending on the origin of the source, the processing yields contain varying amounts of smectite clay, calcium carbonate and feldspar, as well as quartz. The smectite clay may be comprised of montmorillonite, hectorite, saponite or mixtures thereof; while feldspar may include potassium and/or sodium-potassium aluminum silicates [$(Na,K) AlSi_3O_8$, $KAlSi_3O_8$], as well as calcium and barium aluminum silicates; the calcium carbonate may include $CaCO_3$ and/or $CaMg(CO_3)_2$. The solid ingredients are provided in a water base to form an aqueous fraction, with an amount of a workability enhancing additive, such as a heavy hydrocarbon, e.g. kerosene. Other workabilty enhancers may be used, including such organic solvents such as glycol ethers or glycerine. A relatively small amount of surfactant is also preferably added to encourage the homogenization of the hydrocarbon and aqueous fractions. This may be a nonionic, cationic or anionic surfactant.

While many of the commercial-grade prior art compositions contain generally about 25% kerosene, the present composition requires only about 3-20% kerosene. Nevertheless, it is understood that the skilled person can increase the kerosene and/or water (and accordingly the amount of surfactant) to prepare the buffing composition as a gel, semi-liquid or liquid. For example, a composition containing about 6% kerosene will generally be a paste, while a composition having about 12% kerosene, with a mineral base of about 87%, will be a gel or semi-liquid. Another version having kerosene at about 39%, mineral blend at about 60%, and quartz at about 0.6%, would be in the form of a liquid.

Prior art compositions have a relatively small particle size (average about 2-17 µm, maximum about 35 µm). The present invention has an average particle size of about 30-45 µm, and contains particles up to about 100 µm. While the larger particles may have the effect of increasing the abrasiveness and the resulting buffing effect, they can also lead to scratching. Applicants have found that with the inventive composition, the potential scratching of the larger particles is avoided, while allowing the increased buffing capacity to take effect. It is theorized that this may have to do with the presence of one or both of the clay or the carbonate.

DETAILED DESCRIPTION OF THE INVENTION

Accordingly, a buffing composition is provided which comprises (all amounts in mass percent):

| | |
|---|---|
| (1) calcium carbonate | 20-30% |
| (2) feldspar | 7-59% |
| (3) smectite clay | 3-7% |
| (4) water | 37-64% |
| (5) quartz | 0.01-1% |
| (6) opal CT | 1-2% |
| (7) kerosene | 3-20% |
| (8) surfactant | 0.01-1% |
| (9) preservative | <0.5% |

It is noted that opal CT may be present as naturally occurring components in a smectite process stream. It is not believed that this component affects the buffing characteristics and therefore it is not considered as part of the invention. The average particle size of the composition should be between about 30 and 45 µm, while the particle size may be up to about 100 µm. While the minimal size is preferably at least 1 μm, it should be recognized that smaller particles may be present so long as the preferred average size is achieved. A preservative, such as KATHON® CG/ICP (or CG/ICP II) from Rohm & Haas or 4,4-dimethyloxazolidine BIOBAN® CS-1135 biocide from Dow Chemicals may also optionally be present, and it is understood that does not affect the buffing characteristics of the compound.

Furthermore, though feldspar in its natural state is used herein, it is understood that aluminum silicates from any source should work within the invention. In addition, while it is believed that quartz may play an important role in the improved composition, it may also be that it is the presence of silicates in general (as a combination of quartz and feldspar/aluminum silicates) that is effective. Nevertheless, the buffing is achieved with less total silicate than the prior art compositions. Still further, it is also possible that the superior properties of the present composition stem from the larger particle size buffered by the presence of the clay. In this regard, it is contemplated that other clays, e.g. kaolin, may also be effective in place of smectite; and that other abrasive compounds, such as aluminum oxides or other commercial abrasives, may be effective in place of the silicates; so long as the particle size and relative amounts of components are generally maintained. In this regard, the invention can also be considered to comprise:

| | |
|---|---|
| (1) calcium carbonate | 20-30% |
| (2) abrasive compound (silicates, oxides) | 7-59% |
| (3) clay | 3-7% |
| (4) water | 37-64% |
| (5) kerosene | 3-20% |
| (6) surfactant | 0.01-1% |
| and optionally | |
| (7) quartz | 0.01-1% | with the particle size parameters set forth above.

While calcium carbonate is useful in automobile polishes, the basic invention may also be useful in other types of polishes, such as tile polish, hard surface cleaners, cleaners for plastic, rubber, silver or other metal polish. In such a case, it is believed that the calcium carbonate may be reduced or eliminated, while the remaining components are left in the above relative proportions, and with the above stated particle size parameters.

EXPERIMENTAL DATA

A dispersed composition known as Composition A having the following composition was prepared:
46% water
22% calcium carbonate
12% feldspar
6.6% smectite clay
1.8% opal CT
0.6% quartz
6.94% kerosene
0.4% surfactant Ultra Palmolive® liquid detergent, available from Colgate-Palmolive Company, is added as a surfactant, and contains magnesium and sodium dodecylbenzene sulfonate, ammonium laureth sulfate, among others. It should understood that other surfactants and carriers may be used according to conventions known in the art.

The composition A was agitated with dual propeller for about 90 seconds at 900 rpm to create an emulsion.

Comparative Example B was Bondo Corporation Dynatron Automotive Rubbing Compound, which lists the following composition:

| | |
|---|---|
| Alpha quartz | 42% |
| Kerosene | 27% |
| Alpha terpineol | 1.67% |
| Limonene | 0.27% |
| Water | 28.2% |

Used vehicles have two types of automotive finish coats. The body paint on vehicles manufactured prior to the early 1990s typically were final coated with a clear protective coating commonly referred to as 'clear coat'. Later model vehicles manufactured following this period have an automotive finish coat commonly referred to as 'gel coat'. Both types of coats respond differently to rubbing and cleaning compounds.

Experiments were performed to assess the Experimental Composition A in comparison to the prior art Composition B. The experiments were completed using both older and late model vehicles with the two different finish coats, clear coat and gel coat.

A set of tests was completed with the Compositions A and B on both types of finishes. Compared to Composition B, the cutting ability of Composition A was superior, and no scratches were left on the finish; workability (amount of buffing time before drying) was 125 to 150% better; final finish showed no evidence of swirl marks or hazing, while Composition B left the finish with a significant hazing that would require the use of a glazing compound; and the overall sheen of the body was better when Composition A was used.

What is claimed is:

1. An abrasive polishing compound for automotive coatings and plastic and rubber surfaces, consisting essentially of, in mass percent:
   calcium carbonate at about 20-30%,
   aluminum silicate at about 7-59%,
   smectite clay at about 3-7%,
   water at about 37-64%,
   organic solvent at about 3-20%,
   surfactant at about 0.01-1%, and
   optionally, quartz, at about 0.01-1%.

2. The composition of claim 1, wherein the aluminum silicate is feldspar.

3. The composition of claim 1, wherein the organic solvent is kerosene.

4. The composition of claim 1, wherein the quartz is present.

5. The composition of claim 1, wherein average diameter of particles of combination of the calcium carbonate, aluminum silicate and the smectite clay is between about 30 and 45 μm.

6. The composition of claim 5, wherein the aluminum silicate comprises feldspar at 7-12%.

* * * * *